US012643834B2

(12) United States Patent
Valeriani et al.

(10) Patent No.: US 12,643,834 B2
(45) Date of Patent: Jun. 2, 2026

(54) METHOD FOR PRODUCING CERAMIC TILES

(71) Applicant: Marazzi Group SRL, Sassuolo (IT)

(72) Inventors: Lorenzo Valeriani, Sassuolo (IT);
Lorenzo Corradini, Sassuolo (IT)

(73) Assignee: Marazzi Group SRL, Sassuolo (IT)

( * ) Notice: Subject to any disclaimer, the term of this patent is extended or adjusted under 35 U.S.C. 154(b) by 191 days.

(21) Appl. No.: 18/038,783

(22) PCT Filed: Nov. 26, 2021

(86) PCT No.: PCT/IB2021/060996
§ 371 (c)(1),
(2) Date: May 25, 2023

(87) PCT Pub. No.: WO2022/113005
PCT Pub. Date: Jun. 2, 2022

(65) Prior Publication Data
US 2024/0002303 A1      Jan. 4, 2024

(30) Foreign Application Priority Data

Nov. 30, 2020    (IT) ........................ 102020000028883

(51) Int. Cl.
*C04B 41/53*          (2006.01)
*C04B 35/64*          (2006.01)
(Continued)

(52) U.S. Cl.
CPC .......... *C04B 41/5346* (2013.01); *C04B 35/64* (2013.01); *C04B 41/009* (2013.01); *C04B 41/91* (2013.01)

(58) Field of Classification Search
CPC .............. B28B 11/048; B28B 11/0818; B28B 11/0872; B44C 1/221; B44C 5/0453;
(Continued)

(56) References Cited

U.S. PATENT DOCUMENTS

| | | | | | |
|---|---|---|---|---|---|
| 4,907,612 | A | * | 3/1990 | Levit ................. | H01L 21/67028 |
| | | | | | 198/860.3 |
| 2015/0064400 | A1 | * | 3/2015 | Stoffel .................... | B30B 3/005 |
| | | | | | 428/141 |
| 2015/0258846 | A1 | * | 9/2015 | Daniels ................ | B41M 5/0047 |
| | | | | | 216/28 |

FOREIGN PATENT DOCUMENTS

| | | | | |
|---|---|---|---|---|
| BE | 462101 | A | 1/1946 | |
| FR | 2513624 | A1 * | 4/1983 | ............... B24C 1/06 |

(Continued)

OTHER PUBLICATIONS

FR2513624A1—Machine Translation (Year: 1983).*
(Continued)

*Primary Examiner* — Yunju Kim

(74) *Attorney, Agent, or Firm* — Ryan D. Jenlink; Conley Rose, P.C.

(57)              ABSTRACT

A method for producing ceramic tiles, comprising the steps of providing a ceramic mixture, forming a raw tile with a body having an upper surface based on said mixture, and firing said raw tile to produce said ceramic tile, wherein the method comprises a step of producing a relief structure on said upper surface and wherein said structure is produced after said forming step and before said firing step.

11 Claims, 3 Drawing Sheets

(51) Int. Cl.
    *C04B 41/00*       (2006.01)
    *C04B 41/91*       (2006.01)

(58) Field of Classification Search
    CPC ........... B44C 1/009; B44C 1/53; C04B 35/64;
               C04B 41/009; C04B 41/53; C04B
               41/5346; C04B 41/91; B24C 1/06
    See application file for complete search history.

(56)            References Cited

FOREIGN PATENT DOCUMENTS

| GB | 2188593 | A | | 10/1987 | | |
|----|---------|---|---|---------|---|---|
| IT | 102020000028883 | | | 11/2020 | | |
| KR | 20170137996 | A | * | 12/2017 | ........... | B28B 11/048 |
| WO | 2017212320 | A1 | | 12/2017 | | |
| WO | 2022113005 | A1 | | 6/2022 | | |

OTHER PUBLICATIONS

KR20170137996A—Machine Translation (Year: 2017).*
International Search Report and Written Opinion of the International Searching Authority, dated Feb. 28, 2022 for Application No. PCT/IB2021/060996 filed Nov. 26, 2021, 9 pages.
Search Report and Written Opinion dated Aug. 18, 2021 for Application No. IT102020000028883 filed Nov. 30, 2020.

* cited by examiner

METHOD FOR PRODUCING CERAMIC TILES

CROSS REFERENCE TO RELATED APPLICATIONS

This application is a filing under 35 U.S.C. 371 of International Application No. PCT/IB2021/060996, filed Nov. 26, 2021, entitled "A Method for Producing Ceramic Tiles," which claims priority to Italian Patent Application No. 102020000028883, filed Nov. 30, 2020, entitled "A Method for Producing Ceramic Tiles," which applications are incorporated by reference herein in their entirety.

TECHNICAL FIELD

The present invention relates to a method for producing ceramic tiles, and ceramic tiles, particularly flooring or cladding tiles.

BACKGROUND

Ceramic tiles usually comprise a substantially panel-shaped body of ceramic material, having a decorative surface which may be glazed or unglazed. The decorative surface may also have a pattern, representing, for example, an imitation of wood, natural stone, marble, concrete, resin or any other design. The decorative surface of the tile may also comprise a relief structure, representing the grain of stone or wood, for example.

The relief structure is produced by pressing during the forming of the tile. In practice, the powders forming the ceramic mixture are placed in a mould and pressed with a die having a structure corresponding to the negative of the relief structure of the tile. Pressing may take place in a continuous process, or another process in which no mould is used, where the negative structure is applied to a compacting belt. The need to use dies, or other preformed negatives, limits the variability of the relief structures that can be produced. Furthermore, the negatives are subject to wear, due mainly to the hardness of the powders and the high production rate. The wear makes it necessary to regenerate or replace the negatives, which consequently increases costs, especially in the case of compacting belts.

An alternative solution proposes the application of sinking agents to the glaze covering the decorative surface of tiles Sinking agents are substances capable of opening the vitreous structure of the glaze, creating depressions Sinking agents may also be applied by digital printing so as to increase the variability of the structures. However, this solution is only applicable to glazed tiles. Moreover, since the relief structure can only be produced in the glaze, the depth of the relief is limited to the thickness of the glaze itself, and is therefore considerably less than the thickness of the relief structure that can be produced by pressing or compaction.

The present invention proposes, in the first place, to provide an alternative method for producing ceramic tiles, which, according to some of its embodiments, is intended to resolve one or more of the problems arising from the prior art.

BRIEF SUMMARY OF THE INVENTION

The present invention, according to a first independent aspect, proposes a method for producing a ceramic tile, comprising the steps of providing a ceramic mixture, forming a raw tile having a body with an upper surface starting from said mixture, and firing said raw tile to produce a ceramic tile, characterized in that it comprises a step of producing a relief structure on a surface of the tile, in which said relief structure is produced according to one or more procedures as listed below. In the context of the present invention, "relief structure" is taken to mean a three-dimensional structure formed by recesses and/or protrusions.

According to a first procedure of the first independent aspect, said structure is produced at least partially after said body has been formed and before the firing step. Since the structure is produced after the step of forming the raw tile, by pressing for example, the variability of the structure is not restricted by the number of pressing rams and can thus make it possible to produce tiles with a wide variability of structures and designs. Furthermore, by forming the structure before the firing step, it may be possible to work the material while it is still unconsolidated, so as to produce deeper structures than when the structure is formed on the glaze.

A second procedure of the first independent aspect provides for producing said structure at least partially by digital methods, such as digital inkjet printing. Thus the variability of the structures that can be produced can be significantly increased. It is also possible to increase the product changeover speed, and consequently the output of the production line.

A third procedure of the first independent aspect provides for producing said structure at least partially by contactless methods. Thus, since it is unnecessary to use a contact impression element such as a ram or a preformed belt, it is possible to increase the variability of the structures that can be produced. Thus it is also possible to add detail elements of the structure to a pre-existing structure, for example one formed by the same contactless method or another method. Contactless methods can also be free of the design constraints typical of contact impression means, such as undercuts and clearance angles. Contactless methods can therefore make it possible to produce structures that cannot be produced with contact methods. For example, said structure may be produced by means of a plurality of procedures, at least one of which is a contactless method, for example contactless impression or fluid spraying.

The first independent aspect of the invention, according to each of the aforementioned procedures, may be achieved by means of various embodiments, three of which are described below by way of non-limiting example.

According to a first possible implementation of said first independent aspect, said relief structure may be produced by a process of erosion of the upper surface of the raw tile body such that depressions, or recesses, are produced in said upper surface according to a predetermined pattern. By using a fluid to erode the surface it may be possible to avoid the use of mechanical impression means, which must be prepared in advance according to the predetermined pattern, whereas the fluid can be sprayed according to said predetermined pattern without any upstream preparation, thus increasing the variation of structures that can be produced and shortening the time required for structure changeover and/or product changeover. Said erosion may be chemical, physical or mechanical. Preferably, said erosion may be carried out at least by spraying a fluid, advantageously at high pressure, on to said upper surface. According to the preferred embodiment, the fluid is compressed air or other pressurized gas, for example an inert gas. By using compressed air or another inert gas, it may be possible to avoid, or at least limit, the contamination of the body mixture and of the material removed, so that the latter can be recovered.

According to alternative embodiments, the fluid may comprise water (water jet) or other fluids. The fluid may be sprayed at a pressure of more than 1 bar, for example more than 10 bar. Preferably, the fluid may be sprayed at a pressure of less than 1000 bar, for example less than 100 bars. The inventor has found that, by increasing the pressure of the fluid, it is possible to increase the efficacy and depth of the erosion. Advantageously, during the step of forming the relief structure, the pressure may be modulated so as to regulate the depth and obtain deeper and/or shallower depressions in a predetermined manner. By using relatively high pressures, it may be possible to produce relatively deep structures, for example structures with a depth of more than 0.005 mm, preferably more than 0.5 mm, more preferably more than 1 mm, for example more than 2 mm.

According to the first possible implementation, the depth of the structure may be modulated by adjusting one or more parameters, including but not limited to: spraying pressure, amplitude of the fluid spraying jet, spraying time, number and/or frequency of spraying pulses. For example, by reducing the amplitude of the fluid spraying jet it is possible to concentrate the pressure on a smaller region of the upper surface of the tile, producing greater depth of erosion and/or higher definition of the structure. For example, by maintaining a continuous spray jet for a specified time in an area of the upper surface it is possible to obtain a depth of erosion where said depth increases with the increase of said time. Alternatively, a continuous spraying jet for a specified time could be replaced by a plurality of discrete spraying pulses, each having its own spraying time. In this way, the depth of the erosion would be a function of the number of said pulses.

According to the preferred embodiment, in accordance with the first possible implementation, the fluid may comprise abrasive particles to improve the erosion efficacy. Advantageously, said abrasive particles may comprise one or more minerals and may, preferably, be selected from among the raw materials making up the ceramic mixture, so as to limit the risk of contaminating the mixture. For example, said abrasive particles may comprise particles of clay, kaolin, feldspar, aluminosilicates in general, quartz, zirconium silicate, zirconium oxide, and/or alumina. In some embodiments, said abrasive particles may comprise particles of ceramic mixture, preferably from the same mixture as that which makes up the body of the raw tile. Thus said abrasive particles may be totally re-used together with the removed material. Advantageously, said abrasive particles may have a particle size of between 0.1 and 500 μm, preferably between 1 μm and 100 μm. Preferably, the particles may comprise a 64 μm residue which is less than 20% by weight, for example less than 10%. Surprisingly, the inventors have discovered that, by reducing the particle size of the abrasive particles, it is possible to improve the definition of the structure that can be obtained.

According to the preferred embodiment, in accordance with the first possible implementation, said fluid is sprayed according to a predetermined pattern, so as to form depressions in accordance with said predetermined pattern. Preferably, said predetermined pattern is a digital pattern. Preferably, said digital pattern may be on a grey scale in which each value of the scale corresponds to a depth of the excavation to be obtained. Said digital pattern preferably has a resolution of more than 200 dpi, for example more than 300 dpi.

According to the first possible implementation, said predetermined pattern may be produced by means of a digitally controlled device. According to a preferred embodiment, said device comprises one or more nozzles for spraying said fluid. Said nozzles may preferably be connected to a circuit for supplying said fluid, for example a pneumatic or hydraulic circuit. Additionally, said nozzles may be connected to a circuit for supplying abrasive particles. Said nozzles may comprise an opening for expelling the fluid, having a diameter which is preferably less than 3 mm, more preferably less than 2 mm, and advantageously less than 1 mm. Additionally, said opening may have a diameter which is preferably greater than 0.5 mm, or more preferably greater than 1 mm. Said device may be produced according to multiple variants, two of which are described below as preferred variants.

According to a first variant, said device may comprise at least one array of nozzles, in which, in each array, said nozzles may be positioned in alignment along a direction which is transverse, and preferably orthogonal, to a direction of advance of the raw tile, and particularly of the body of the tile. Each array may preferably comprise a sufficient number of nozzles to extend over the whole width of the tile ("width" being taken to mean the dimension of the tile lying transversely to the direction of advance of the tile). There is no reason why the device should not comprise a plurality of arrays of nozzles, each being capable of extending over a portion of said width of the tile, and in which there is a sufficient number of said arrays to extend over the whole width of the tile. The device may comprise a plurality of arrays positioned in sequence along said direction of advance. The nozzles of an array may be offset along the direction of advance from the nozzles of another array, so as to enable the fluid to be sprayed over the whole surface of the body of the raw tile, that is to say including the gap between the nozzles of an array. Additionally or alternatively, the nozzles of an array may be aligned along the direction of advance with the nozzles of another array, so as to enable a plurality of pulses to be sprayed in the same area of the upper surface without interrupting the advance of the raw tile. Preferably, the nozzles of each array may have the same shape and/or size, and/or may be configured to spray the same fluid. Each array may comprise nozzles that have a different shape and/or size, and/or are configured to spray a different fluid, from the nozzles of another array. Advantageously, the nozzles according to the first possibility may remain stationary during the spraying of the fluid. In particular, the nozzles may remain stationary relative to a plane parallel to the plane of advance of the tile. Additionally, during the spraying of the fluid the tile may advance towards and beyond said nozzles, preferably in a single continuous movement. This first variant of the device may enable high output to be achieved.

According to a second variant embodiment of the device, the device may comprise at least one nozzle mounted on a carriage configured to be translated along a direction which is transverse, and preferably orthogonal, to a direction of advance of the raw tile, and particularly of the body of the tile. One or more arrays of nozzles, aligned along the direction of translation of the carriage, may be installed on said carriage, and the nozzles in question may have one or more of the characteristics described with reference to the first possible implementation of the device; however, the arrays according to the present second possibility may preferably extend over a portion of said width of the tile. Additionally, during the spraying of the fluid, the tile may advance towards and beyond said nozzles, preferably in a stepping movement. In practice, the tile may advance by a specified length (or step) and then stop; while the tile is stationary, the tile advances along its own direction of translation and the nozzles spray the fluid to form the structure along a strip whose width is substantially equal to the step of advance of the tile; at the end of the travel of the carriage, the tile advances by another step, and the operation is repeated. In this second possibility, the device enables the structure to be produced over a longer period relative to the first possibility, but it requires fewer nozzles and the device may therefore be less costly to produce. According to an alternative embodiment of said second variant embodiment of the device, said at least one nozzle may be mounted on a robot, for example a Cartesian or anthropomorphic robot.

Advantageously, said nozzles and/or other components of the device according to the first and second variant embodiment may be formed at least partially from, or may be coated in, wear-resistant materials. Additionally, according to each variant of the device, it may be possible to modify the distance between said at least one nozzle and said upper surface. Thus it may be possible to adjust the pressure of the fluid acting on the upper surface and/or the amplitude of the spray jet.

The device, according to any variant embodiment, may comprise means for recovering the abrasive particles and/or for recovering the material removed from the raw tile. Preferably, said recovery means may comprise a suction circuit; for example, the device may be housed in a casing kept at low pressure (that is to say at a pressure below atmospheric pressure), or said suction circuit may comprise one or more suction orifices located near the nozzles, preferably downstream of the nozzles relative to said direction of advance. Thus the particles may be re-used to form new structures, or, together with the removed material, for producing a mixture for forming new tiles.

In a second possibility of said first independent aspect, said structure may be produced by initially spraying the fluid on to the upper surface of the raw tile body, and subsequently eroding the structure. In this case, said fluid may be a fluid capable of softening the upper surface of the body for the subsequent erosion of the upper surface. Preferably, said fluid could be water, or an organic substance, or a substance capable of breaking the bond between the particles of the mixture. Said fluid may preferably be printed by digital printing methods, of the inkjet type for example, in which said ink is, or comprises, said fluid. For example, said fluid may be printed by means of a single-pass or multi-pass printer, the general characteristics of which are known to those skilled in the art. The fluid can then be sprayed and/or printed in accordance with a predetermined pattern, preferably a digital pattern. Preferably, the subsequent erosion may be carried out in such a way as to erode substantially only the softened part of the upper surface. The subsequent erosion may be chemical, physical or, preferably, mechanical. Preferably, said erosion may be carried out by spraying a second fluid such as compressed air, advantageously at high pressure, on to said upper surface. Said spraying may take place at a pressure such that the erosion of only the softened part is permitted, leaving the non-softened part substantially unaltered. For example, said pressure may be equal to or less than 50 bar, preferably less than 10 bar. Said fluid may have one or more of the characteristics described according to the first possibility. Preferably, said fluid according to the second possibility may be free of the abrasive particles. Preferably, said fluid according to the second possibility may also be sprayed in a substantially uniform manner on to the whole upper surface of the raw tile. Alternatively, said erosion may take place by brushing, scraping or other methods of mechanical interaction by contact. Brushing may be carried out using brushes whose stiffness is chosen so as to selectively erode the softened part of the raw tile, while preferably leaving the non-softened part substantially unaltered. Said brushes may have bristles made of, or coated in, highly wear-resistant material and/or low-adhesion material, to avoid the build-up of the removed material on said brushes. According to the second possibility of the invention, it may be possible to selectively determine the depth of the softened portion; for example, the time interval between the spraying of the fluid and the erosion step may be increased to allow the fluid to be absorbed more deeply, for example by using suitable means to adjust the distance between the fluid spraying device, for example the printer, and the device for removing the softened part, for example the brushes; or different amounts of the fluid may be sprayed in predetermined areas of the pattern so that the fluid is absorbed more deeply, or different fluids may be sprayed, with each fluid configured to be absorbed by the raw tile mixture in such a way as to reach a predetermined depth.

According to a third possibility of said first independent aspect of the invention, said relief structure may be produced by a controlled process of deposition of material on the upper surface of the raw tile body. Said second variant differs from the preferred embodiment described above substantially in that said abrasive particles may be replaced with particles of mixture, from the same mixture as the raw tile for example, preferably having a moisture content of more than 1% by weight, or preferably more than 5% by weight, for example more than 8% by weight. Additionally, the fluid is sprayed at a pressure lower than or equal to the pressure used in the preferred embodiment described above, for example at a pressure of less than 100 bar, preferably less than 50 bar. Preferably, the fluid may be sprayed at a pressure of between 1 bar and 100 bar, for example between 1 bar and 50 bar. Thus the particles of mixture, instead of eroding the material on the upper surface of the raw tile, are deposited on said surface, adhering to it because of their moisture content. The method could then provide a step of drying the deposited material, by irradiation or convention for example. Advantageously, said third possibility may be provided by means of a device substantially identical to the device of the preferred embodiment. There is no reason why the method should not comprise the step of producing said structure both according to the preferred embodiment and according to the second variant, possibly using the same device. This would make it possible to produce more complex and variable structures.

According to a fourth possibility of said first aspect, the step of producing said structure could provide for positioning a mask on said upper surface of the body, in which said mask may comprise one or more openings shaped and/or arranged according to a predetermined pattern, and then spraying a fluid on to said upper surface, so that the mask allows the fluid to pass through only at the positions of said openings. Said fluid may be configured to erode the upper surface of the body, thus generating recesses with the same characteristics as those described according to the first possibility, and/or to deposit mixture, thus generating protrusions with the same characteristics as those described according to the third possibility.

According to any of the aforementioned possibilities of the first independent aspect, said structure may represent the grain of wood or stone, or represent the structure of any material such as concrete, metals or resin. Said structure may be produced according to any pattern and may represent said pattern.

According to an alternative embodiment, said structure could be produced on the lower surface of said body. In this case, said structure may preferably comprise recesses or depressions arranged according to a predetermined pattern and configured to define housings for electrical wiring, pipes and/or other installations.

According to the preferred embodiment of the first independent aspect, the raw tile comprises at least a ceramic mixture suitable for the production, after firing, of a tile of ceramic material such as porcellaneous stoneware, monoporous ceramic, white or red body ceramic, maiolica, or terracotta. The mixture comprises a mix of powders of raw materials such as clay, kaolin, feldspar, quartz, oxides and other minerals.

In the method according to the invention, the raw tile may be formed by compacting the mixture by continuous compaction and/or discontinuous pressing. There is no reason why the raw tile should not be produced by extrusion, in less preferred embodiments. Preferably, the compaction of the mixture is carried out with moulds and/or compacting belts capable of producing a substantially smooth upper surface of the raw tile. However, in alternative embodiments, the mould and/or it compacting belt could comprise a structure that is the negative of the structure to be produced on the upper surface of the raw tile. In this case, it would be possible to produce a first basic structure during forming, and then, after the forming step, to execute a step for producing a second structure according to the first independent aspect of the invention. In this way, the second structure may be limited to modifications and/or aspects of detail relative to the first structure, so as to increase the variability of the structures.

Preferably, the method may comprise a drying step, to eliminate at least some of any residual moisture from the mixture, and to impart greater mechanical strength to the raw tile. The drying is preferably carried out at temperatures above 80° C., for example above 100° C. The drying is carried out after the pressing step, and may preferably be carried out before the step of forming the structure. Preferably, the raw tile after drying has a residual moisture content of less than 5%, or preferably less than 1%. These values of moisture content are relatively low and could impart greater strength to the raw tile for withstanding the subsequent forming of the structure.

The method may also comprise a step of applying at least one background coating, for example a glaze and/or an engobe, to the upper surface of the tile. In particular, according to the preferred embodiment of the invention, the background coating may be applied after the forming of the structure. For example, the background coating may be applied wet, by pouring or airbrushing for example, so as to deposit a substantially uniform layer on the upper surface of the substrate. However, there is no reason why the background coating should not be applied by other methods, for example by digital printing, screen printing or flexography, or by dry application methods.

It should also be noted that the method may provide the step of applying a design to the upper surface of the raw tile. Preferably, the design is printed, preferably by digital printing, inkjet for example, although other printing methods such as screen printing, flexography, offset and rotogravure are not ruled out. However, inkjet printing and contactless printing methods in general are preferred, because they enable the design to be applied even to highly developed structures. According to the preferred embodiment of the invention, the printing is carried out after the forming of the structure. Preferably, the design may have characteristics corresponding to structural characteristics of the relief. For example, where the design represents a pore of wood or stone, the structure may have a recess representing the pore.

In this way the realism of the design may be improved. It is emphasized that the design may be applied to the background coating or directly to the upper surface of the substrate.

Advantageously, the method may also comprise a step of applying a protective coating, for example a glaze and/or grog, to the upper surface of the raw tile. In particular, according to the preferred embodiment of the invention, the preferred coating may be applied after the production of the structure, and preferably after the application of said design. Advantageously, the protective covering may be transparent or translucent. The protective coating is preferably applied wet, by pouring or airbrushing for example, so as to deposit a substantially uniform layer on the upper surface of the tile. There is no reason why the protective coating should not be applied by other methods, for example by digital printing, screen printing or flexography, or by dry application methods.

The method also comprises the step of firing the tile at a temperature of more than 900° C., or preferably more than 1000° C., for example about 1200° C. The firing step follows the step of producing the structure, and preferably follows the steps of applying the background and protective coatings and of the design, so that the substrate and coatings are fired together.

According to a second independent aspect, the invention relates to a ceramic tile or panel comprising at least a body of ceramic material having an upper surface provided with a relief, in which said relief is produced according to a predetermined pattern, and in which said relief is produced by digital methods.

A further independent aspect of the invention relates to a set of ceramic tiles or panels, each comprising at least a body of ceramic material having an upper surface provided with a relief, in which said relief is produced according to a predetermined pattern, and in which said pattern is different in each tile of the set.

A third independent aspect of the invention relates to a device for producing a structure on a raw tile, in which the device comprises at least one nozzle capable of spraying a fluid on to the upper surface of said tile to erode said upper surface locally and/or to accumulate material on said upper surface. Preferably, said device is configured to produce said structure according to a predetermined pattern. Preferably, said device is digitally controlled; for example, it may comprise, or be connected to, a control unit. The device according to said third independent aspect may comprise one or more of the characteristics described in relation to the device with reference to the first embodiment.

A fourth independent aspect of the invention relates to a production line for ceramic tiles or panels, which comprises at least one station for forming raw tiles and at least one kiln for firing said tiles, with the characteristic that said line comprises at least one device for producing a structure on the tile or panel, where said device is located downstream of the forming station and upstream of the kiln. Preferably, said device may comprise one or more of the characteristics described in relation to the device with reference to the first or third embodiment. The line may also comprise one or more devices, each capable of carrying out one of the steps of the method as described with reference to the first independent aspect.

Further characteristics and advantages of the invention will be apparent from a perusal of the following examples, provided by way of non-limiting example, with the aid of the figures appearing on the attached sheets.

DETAILED DESCRIPTION OF THE INVENTION

Figure 1:
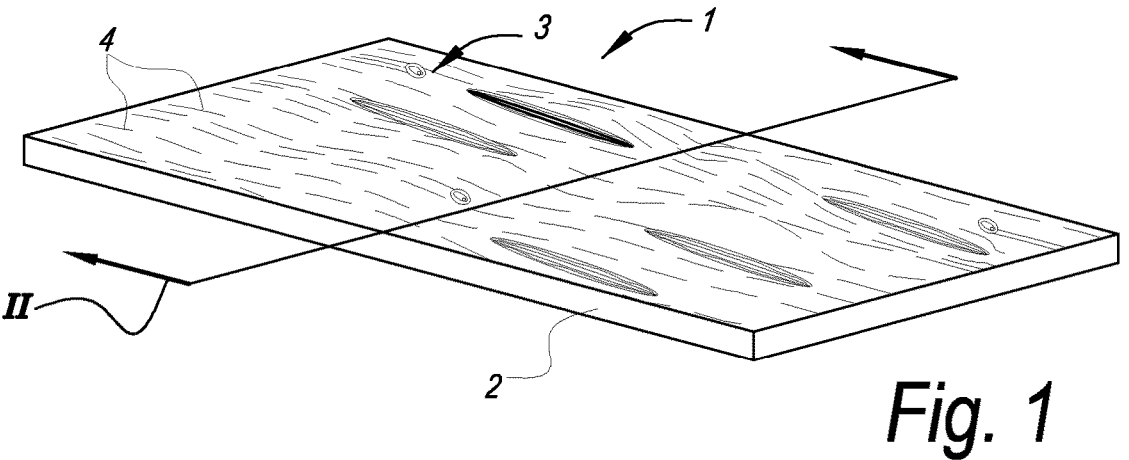
FIG. 1 is an axonometric view of a tile produced by the method according to the invention.

FIG. 1 shows a ceramic tile 1 comprising a body 2 of ceramic material, porcellaneous stoneware for example, and an upper surface 3 having a design 4, representing wood or stone for example.

Figure 2:
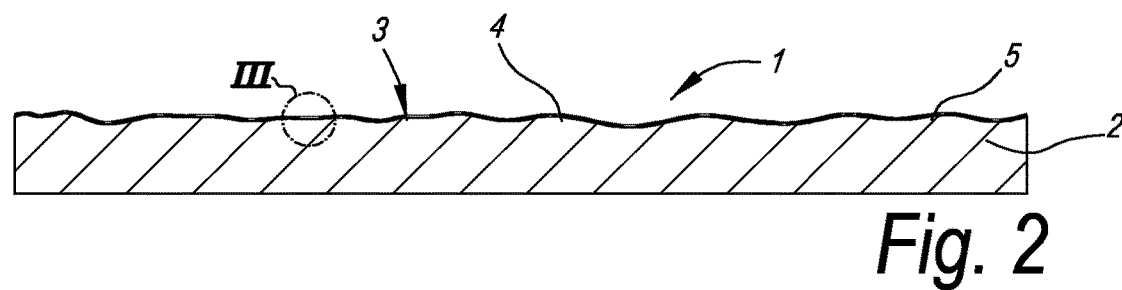
FIG. 2 is an enlargement of the cross section taken along the plane II-II of FIG. 1.

As shown in FIG. 2, the tile 1 comprises a relief structure 5 formed in said body 2 and apparent on the upper surface 3. The relief structure 5 may represent the grain of wood or natural stone, and may have structural characteristics, such as recesses or protrusions, corresponding to characteristics of the design 4.

Figure 3:
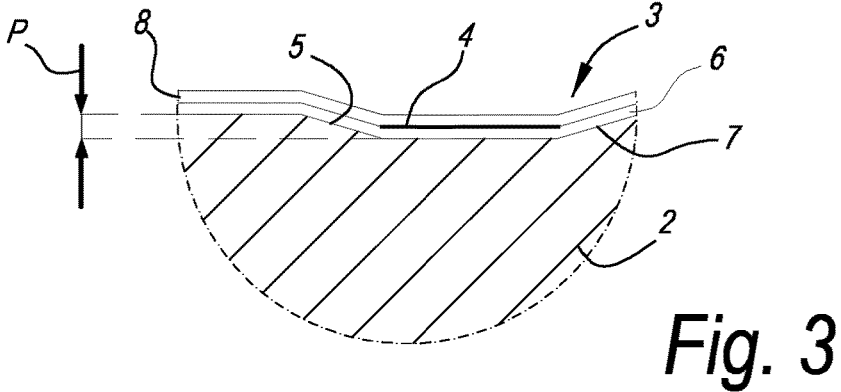
FIG. 3 is an enlargement of the area III of FIG. 2.

FIG. 3 shows that the tile 1 further comprises a background coating 6, a glaze for example, placed on the upper surface 7 of the body 2 and under the design 4. In the illustrated example, the tile 1 also comprises a protective coating, preferably a transparent glaze, placed over the design 4. In the illustrated example, the structure 5 has a maximum depth P of more than 0.5 mm, for example more than 2 mm.

Figures 4, 7, 8:
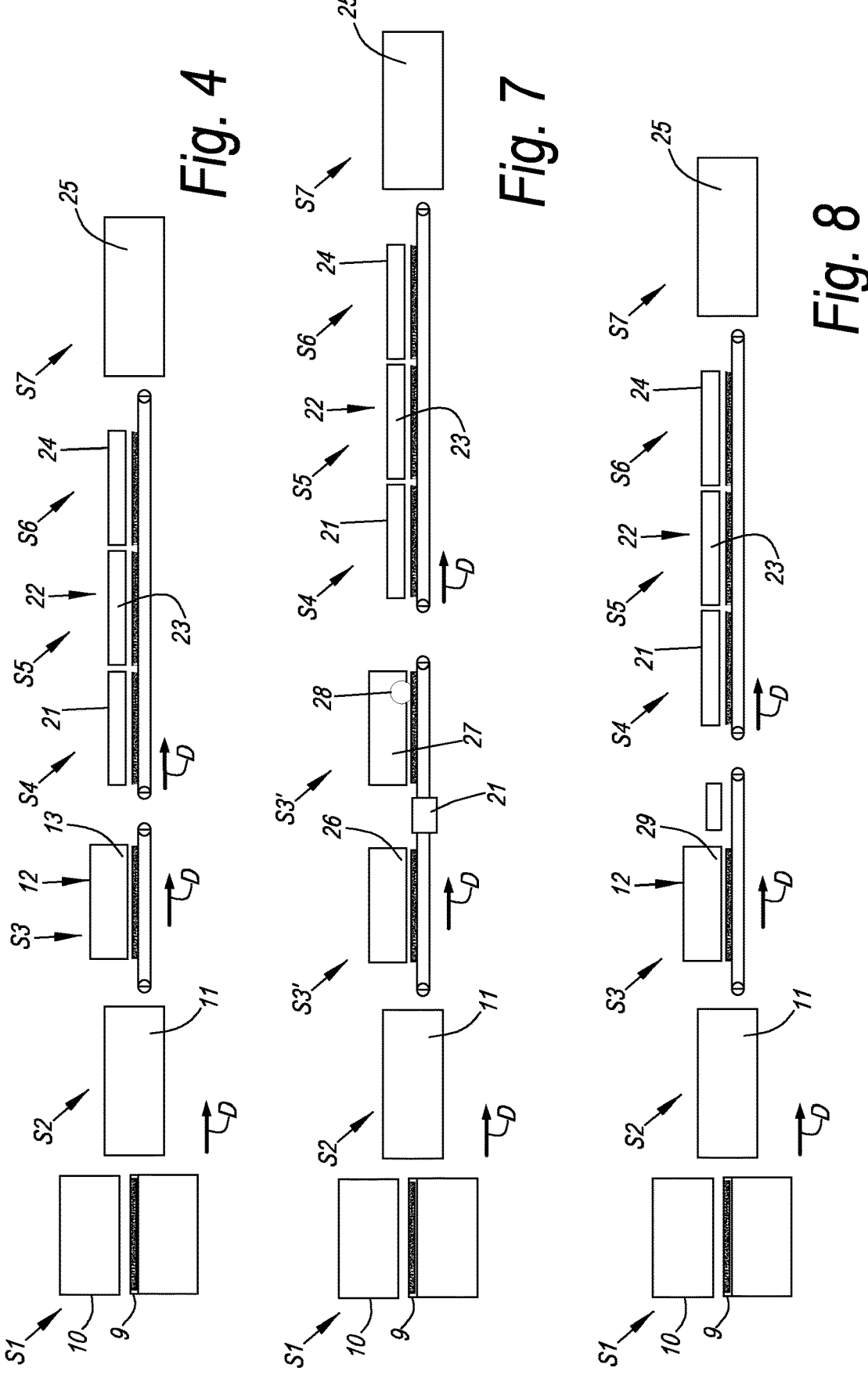
FIG. 4 shows schematically a production line and some procedures of a method according to a first possible implementation of the invention.
FIG. 7 shows schematically a production line and some procedures of a method according to a second possible implementation of the invention.
FIG. 8 shows schematically a production line and some procedures of a method according to a first possible implementation of the invention.

FIG. 4 shows some steps of a method for producing the tile 1 of FIG. 1, according to a first possibility of the first independent aspect of the invention, together with a production line according to the fourth independent aspect.

The method comprises a step S1 of forming a raw tile 9, which in this step is substantially defined by the body 2, by compacting powders of a ceramic mixture. In practice, in a compaction station the powders are compacted, by means of a discontinuous press in the example, so as to impart a substantially panel-like shape to the body 2.

The body 2 advances along the line in a direction of advance D towards a drier 11 for removing moisture from the mixture of the body 2 in a drying step S2. In the example, after the drying step, the body has a residual moisture content of less than 5%.

The body 2 advances in the direction D towards a station 12 for forming the relief structure 5. The station 13 comprises a device described below with the aid of FIGS. 5 and 6.

Figure 5:
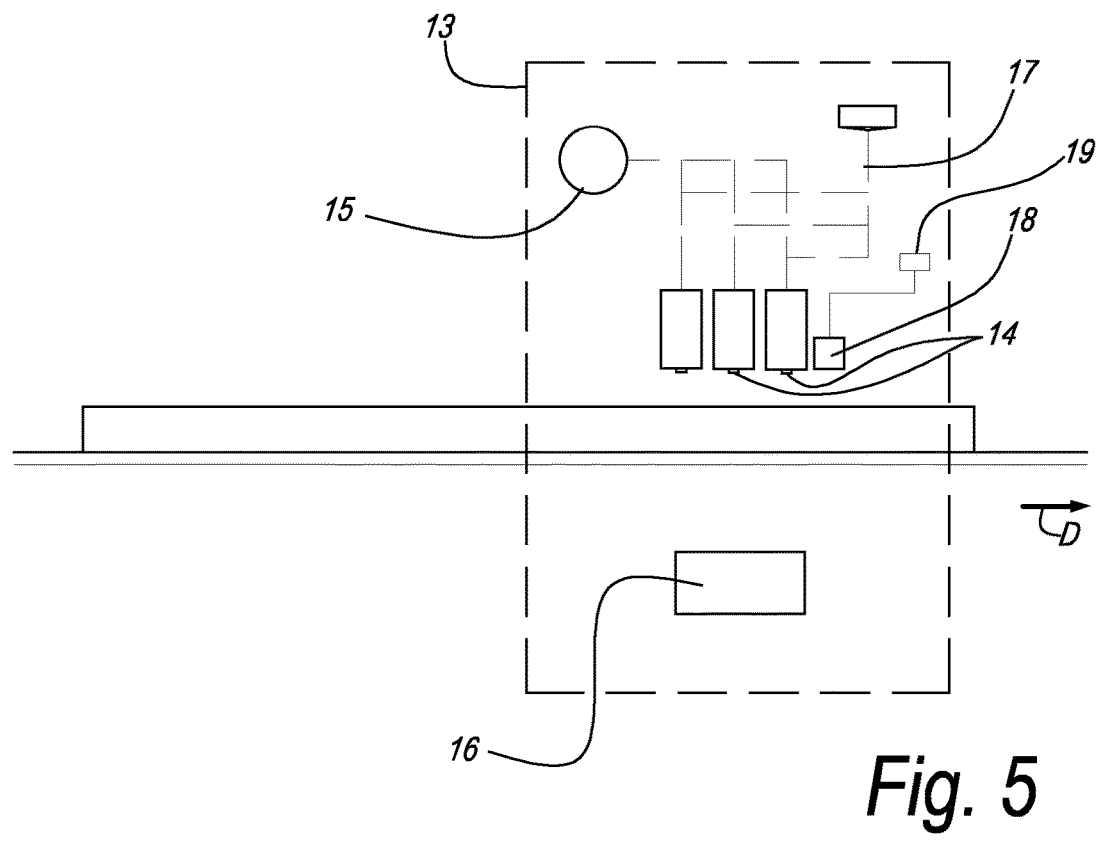
FIG. 5 shows schematically a device for forming a structure on a ceramic tile according to a first possible implementation of the invention.

As shown in FIG. 5, the device 13 comprises a plurality of nozzles 14, connected to a pneumatic circuit 15 and capable of spraying a fluid, particularly compressed air, on to the upper surface 7 of the body 2 so as to erode said upper surface 7 locally. The device 13 comprises a control unit 16, for example a personal computer, capable of digitally controlling the forming of the relief structure 5. In particular, the control unit 16 is capable of causing the fluid to be sprayed according to a digital pattern, on a grey scale for example.

The nozzles 14 are connected to at least one circuit 17 for supplying abrasive particles. In the illustrated example, all the nozzles are connected to the same supply circuit 17, but in other examples each nozzle or group of nozzles could be connected to its own supply circuit 17. The abrasive particles may be chosen from among the raw materials used for forming the mixture of the body 2. Preferably, the abrasive particles have a mean particle size of between 0.1 and 500 µm, and a residue of less than 20% at 64 µm.

FIG. 5 also shows that the device 13 comprises suction means 18, located downstream of the nozzles 14, for recovering the abrasive particles and the removed material. Said suction means 18 are connected to a suitable suction and recovery circuit 19.

Figure 6:
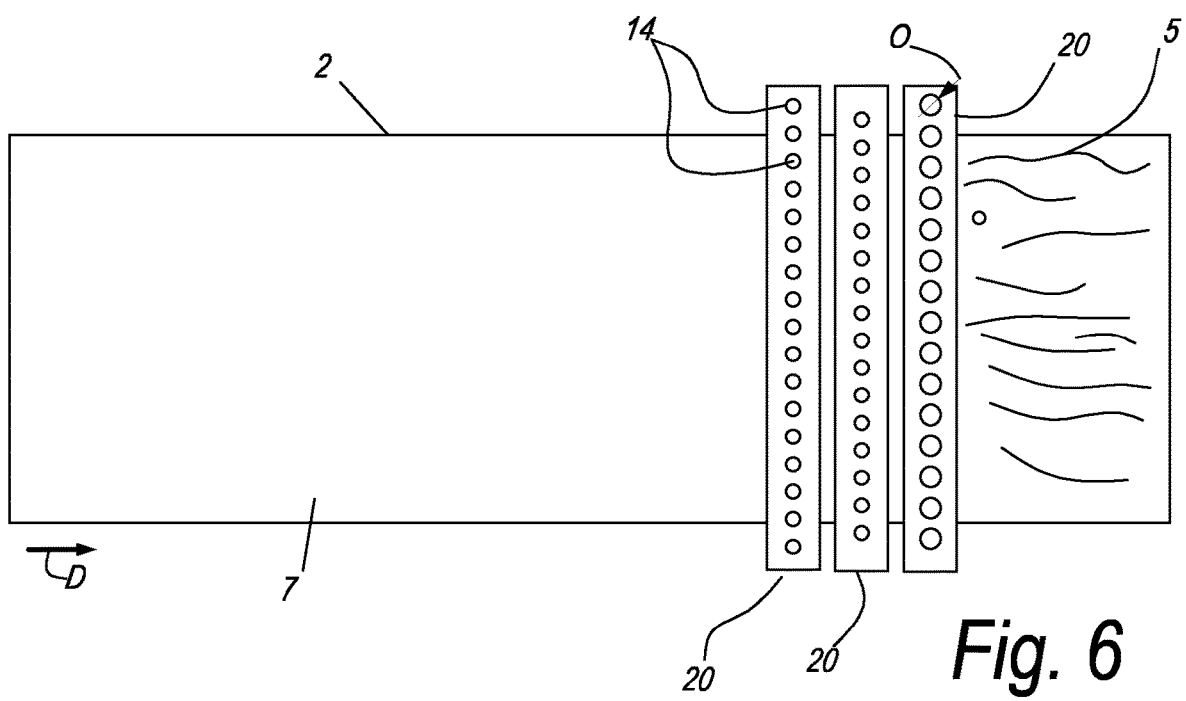
FIG. 6 shows schematically a view from above of the device of FIG. 6.

FIG. 6 shows that the device 13 comprises a plurality of arrays 20 of nozzles 14. Each array 20 comprises nozzles 14 aligned along a direction which is transverse, and preferably orthogonal, to the direction of advance D. Each array comprises a sufficient number of nozzles 14 to overlap the whole width of the body 2 illustrated, and the nozzles 14 of an array 20 are offset along the direction of advance D relative to the nozzles 14 of another array 20 so as to allow the fluid to be sprayed over the whole surface of the body 2. In the illustrated example, each array 20 comprises nozzles 14 having the same diameter O of less than 2 mm, preferably less than 1 mm. In the example, additionally, arrays 20 may comprise nozzles 14 with a diameter O differing from that of nozzles 14 of other arrays.

With reference to FIG. 4 again, the body 2, now provided with a structure 5, advances towards a coating station 21 in which, by means of a coating procedure S4, the raw tile 9 is provided with the background coating 6, by means of airless spraying or airbrushing for example. The coated raw tile 9 advances towards a decorating station 22 having an inkjet printer 23, in which the raw tile is provided with the design 4 by a printing step S5. The raw tile 9, now decorated, advances towards a second coating station 24 in which, by means of a coating procedure S6, the raw tile 9 is provided with the protective coating 8, by means of airless spraying or airbrushing for example.

The raw tile 9 is then subjected to a firing step S7 in a kiln 25, for example a continuous roller kiln, at a maximum temperature of approximately 1200° C., so as to produce the tile 1.

FIG. 7 shows a method for producing the tile 1 according to a second possibility of the first independent aspect. The method of FIG. 7 differs from the method of FIG. 4 in that the step S3 is replaced by a step S3' of printing a fluid, water for example, capable of softening the upper surface of the body 2. In particular, said fluid is printed by means of an inkjet printer 26 of the single-pass type according to a digital pattern, so as to soften the upper surface 7 of the body 2 locally and selectively. The body 2 then advances in the direction of advance D and reaches a brushing device 27 having at least one brush 28 capable of brushing the whole upper surface 7 of the body 2 in an erosion step S3". The bristles of the brush 28 are configured to remove the softened portion of the upper surface 7, leaving the non-softened portion of said upper surface 7 substantially unaltered, so as to form the structure 5. Between the printer 26 and the brush 27, there are positioned means 29 capable of modifying the distance and/or the time that it takes the raw tile 9 to travel from the printer 26 to the brush 27, in order to adjust the depth of penetration of said fluid. According to an alternative embodiment which is not shown, the brushing device 27 may be replaced with a blower capable of blowing a jet of compressed air configured to remove the softened portions of the upper surface 7 selectively.

FIG. 8 shows a method for producing the tile 1 according to a third possibility of the first independent aspect. The embodiment of FIG. 8 differs from the embodiment of FIG. 4 in that, in step S3, the device 13 is configured to spray fluid containing particles of the same mixture as that forming the body 2 at a pressure equal to or less than 50 bar, and/or in that the mixture has a residual moisture content of between 1% and 50%, so as to form protrusions on the upper surface 7 of the body 2. Additionally, the station 12 comprises a drier 29, of the infrared or gas type for example, immediately downstream of the device 13, for drying the mixture forming the protrusions of the structure 5.

The invention thus conceived is susceptible of numerous modifications and variations, all of which are within the scope of the inventive concept.

Furthermore, all the details may be replaced with other technically equivalent elements. In practice, the materials used, as well as the contingent shapes and dimensions, may be any, according to requirements, without thereby departing from the protective scope of the following claims.

Additionally, as is apparent from the content of the description, the present invention relates to one or more of the articles listed below and numbered 1 to 53:

Article 1. Method for producing ceramic tiles (1), comprising the steps of providing a ceramic mixture, forming (S1) a raw tile (9) with a body (2) having an upper surface (7) based on said mixture, and firing (S8) said raw tile (9) to produce said ceramic tile (1), wherein the method comprises a step (S3) of producing a relief structure (5) on said upper surface (7) and wherein said structure (5) is produced after said forming step (S1) and before said firing step (S8).

Article 2. The method according to Article 1, wherein said structure (5) is produced by digital control methods.

Article 3. The method according to any preceding Article, wherein said structure (5) is produced by contactless methods.

Article 4. The method according to any preceding Article, wherein said structure (5) is produced by erosion of the upper surface (7).

Article 5. The method according to any preceding Article, wherein said structure (5) is produced by spraying a fluid on to said upper surface.

Article 6. The method according to Article 5, wherein said fluid is compressed air.

Article 7. The method according to Article 5 or 6, wherein said fluid is sprayed at a pressure of less than 1000 bar, preferably less than 100 bar and/or more than 1 bar, preferably more than 10 bar.

Article 8. The method according to any of Articles 5 to 7, wherein said fluid is sprayed with a pressure that can be modulated according to the depth of the erosion to be obtained.

Article 9. The method according to any of Articles 5 to 8, wherein said fluid is sprayed in a continuous spray jet for a specified time, and wherein said time is a function of the depth of the erosion to be obtained.

Article 10. The method according to any of Articles 5 to 8, wherein said fluid is sprayed in discrete spray pulses, each having its own spraying time, and wherein the depth of the erosion is a function of the number of said pulses.

Article 11. The method according to any of Articles 5 to 10, wherein said fluid comprises abrasive particles.

Article 12. The method according to Article 11, wherein said abrasive particles comprise particles of minerals chosen from among the raw materials of the mixture.

Article 13. The method according to Article 11 or 12, wherein said abrasive particles have a mean particle size of between 0.1 µm and 500 µm.

Article 14. The method according to any of Articles 5 to 13, wherein said fluid is sprayed through one or more nozzles (14).

Article 15. The method according to Article 14, wherein said nozzles (14) are positioned in at least one array (20), and wherein said nozzles (14) in said array (20) are aligned with each other in a direction substantially transverse to a direction of advance (D) of the raw tile.

Article 16. The method according to any of Articles 1 to 4, wherein said structure (5) is produced by spraying (S3') a fluid on to at least a portion of said upper surface (7), wherein said fluid is configured to soften said portion of the upper surface (7), and wherein the method comprises the step of eroding (S3") said softened portion.

Article 17. The method according to Article 16, wherein said fluid is, or comprises, water.

Article 18. The method according to Article 16 or 17, wherein said fluid is printed by inkjet printing (S3').

Article 19. The method according to any of Articles 16 to 18, wherein said fluid is sprayed according to a digital pattern.

Article 20. The method according to any of Articles 16 to 19, comprising a brushing step (S3") for eroding said softened portion.

Article 21. The method according to Article 20, wherein said brushing (S3") is executed by means of a brushing device (28) having at least one brush configured to remove the softened portion of the upper surface (7), leaving the non-softened portion of said upper surface (7) substantially unaltered.

Article 22. The method according to any of Articles 16 to 19, wherein said softened portion is eroded by spraying a second fluid.

Article 23. The method according to Article 22, wherein said second fluid is compressed air.

Article 24. The method according to Article 22 or 23, wherein said second fluid is sprayed at a pressure of less than 100 bar, preferably less than 50 bar.

Article 25. The method according to any of Articles 22 to 24, wherein said second fluid is sprayed in a substantially uniform way over the whole of the upper surface (7).

Article 26. The method according to any of Articles 1 to 3, wherein said structure (5) is produced by controlled deposition of material on to the upper surface (7).

Article 27. The method according to Article 26, wherein said material comprises particles of mixture.

Article 28. The method according to Article 27, wherein said mixture has a residual moisture content of more than 1%, or preferably more than 5%, for example more than 10%.

Article 29. The method according to Article 27 or 28, wherein said structure (5) is produced by spraying a fluid comprising said mixture on to said upper surface.

Article 30. The method according to Article 29, wherein said fluid is compressed air.

Article 31. The method according to Article 29 or 30, wherein said fluid is sprayed at a pressure of less than 1000 bar, preferably less than 100 bar and/or more than 1 bar, preferably more than 10 bar.

Article 32. The method according to any of Articles 29 to 31, wherein said fluid is sprayed in a continuous spray jet for a specified time, and wherein said time is a function of the amount of material to be deposited and/or of the height of the protrusion to be obtained.

Article 33. The method according to any of Articles 29 to 31, wherein said fluid is sprayed in discrete spray pulses, each having its own spraying time, and wherein the number of said pulses is a function of the amount of material to be deposited and/or of the height of the protrusion to be obtained.

Article 34. The method according to any of Articles 29 to 33, wherein said fluid is sprayed through one or more nozzles (14).

Article 35. The method according to Article 34, wherein said nozzles (14) are positioned in at least one array (20), and wherein said nozzles (14) in said array (20) are aligned with each other in a direction substantially transverse to a direction of advance (D) of the raw tile.

Article 36. The method according to any preceding Article, wherein said structure (5) is produced after a step (S2) of drying said body (2).

Article 37. The method according to Article 36, wherein, after said drying step, said mixture has a residual moisture content of less than 5%, or preferably less than 1%.

Article 38. The method according to any preceding Article, wherein said structure (5) is produced before a step (S5) of applying a design (4).

Article 39. The method according to Article 38, wherein said structure (5) has characteristics substantially corresponding to characteristics of said design (4).

Article 40. Device (13) for forming structures in ceramic tiles (1), comprising one or more nozzles (14) connected to a pneumatic circuit (5).

Article 41. The device according to Article 40, comprising at least one array of nozzles (14) aligned with each other in a direction substantially transverse to a direction of advance (D) of the tile.

Article 42. The device according to Article 40 or 41, comprising a control unit (16), for example a personal computer, capable of causing a fluid to be sprayed through said nozzles (14) according to a digital pattern.

Article 43. The device according to any of Articles 40 to 42, comprising a circuit (17) for supplying abrasive particles, connected to said nozzles (14).

Article 44. The device according to any of Articles 40 to 43, comprising suction means (18), located downstream of the nozzles (14) for example, for recovering the abrasive particles and/or the material removed from the tile.

Article 45. The device according to Article 44, wherein said suction means (18) are connected to a suitable suction and recovery circuit (19).

Article 46. The device according to any of Articles 40 to 45, wherein said pneumatic circuit is configured to spray a fluid by means of said nozzles at a pressure of more than 1 bar, preferably more than 10 bar and/or less than 1000 bar, preferably less than 100 bar.

Article 47. Apparatus for forming structures in ceramic tiles (1), comprising a digital inkjet printer (26), preferably of the single-pass type, and a device (13, 27) for eroding at least a portion of the upper surface of the tile.

Article 48. The apparatus according to Article 47, wherein said device (13, 27) is a brushing device (27) comprising at least one brush (28).

Article 49. The apparatus according to Article 47, wherein said device (13, 27) is the device (13) according to any of Articles 40 to 46.

Article 50. Line for the production of ceramic tiles (1) which comprises at least one station (10) for forming raw tiles and at least one kiln (25) for firing said tiles (1), with the characteristic that said line comprises at least one device or apparatus (13, 26, 27) for producing a structure on the tile (1), where said device or apparatus (13, 26, 27) is located downstream of the forming station and upstream of the kiln.

Article 51. The line according to Article 50, wherein said device or apparatus is the device (13) according to any of Articles 40 to 46, or is the apparatus according to any of Articles 47 to 49.

Article 52. Ceramic tile (1) comprising at least a body (2) of ceramic material having an upper surface (7) provided with a relief structure (5), wherein said structure (5) is produced according to a predetermined pattern, and wherein said structure (5) is produced by digital methods.

Article 53. Set of ceramic tiles (1), each comprising at least a body (2) of ceramic material having an upper surface (7) provided with a relief structure (5), wherein a relief structure (5) is produced according to a predetermined pattern, and wherein said relief structure (5) is different in each tile (1) of the set.

The invention claimed is:

1. A method for producing ceramic tiles, comprising the steps of providing a ceramic mixture, forming a raw tile with a body having an upper surface based on said mixture, and firing said raw tile to produce said ceramic tile, wherein the method comprises a step of producing a relief structure on said upper surface and wherein said relief structure is produced by spraying a fluid on to said upper surface after said forming step and before said firing step, wherein said relief is formed by printing water on the surface of the raw tile according to a pattern to soften portions of the surface of the raw tile, wherein said relief is further formed by erosion of the upper surface by removing said softened portion by spraying the fluid, wherein the fluid comprises compressed air, through a plurality of nozzles, wherein said nozzles are positioned in at least one array, wherein said nozzles in said array are aligned with each other in a direction substantially transverse to a direction of advance of the raw tile, and wherein said nozzles are digitally controlled.

2. The method according to claim 1, wherein said relief structure is produced by contactless methods.

3. The method according to claim 1, wherein said fluid is sprayed at a pressure of less than 1000 bar and more than 1 bar.

4. The method according to claim 1, wherein said fluid comprises abrasive particles.

5. The method according to claim 4, wherein said abrasive particles comprise particles of minerals chosen from among the raw materials of the mixture.

6. The method according to claim 4, wherein said abrasive particles have a mean particle size of between 0.1 μm and 500 μm.

7. The method according to claim 1, wherein the method further comprises a step of drying said body, and wherein said relief structure is produced after said drying step.

8. The method according to claim 1, wherein the method further comprises a step of apply a design, and wherein said relief structure is produced before said applying step.

9. The method according to claim 8, wherein said relief structure has characteristics substantially corresponding to characteristics of said design.

10. The method according to claim 8, wherein the design is printed by digital printing.

11. The method according to claim 8, wherein the design is printed by inkjet.

* * * * *